United States Patent
Brockel et al.

(10) Patent No.: US 7,355,513 B1
(45) Date of Patent: Apr. 8, 2008

(54) ULTRA-RELIABLE PERSONNEL POSITION LOCATING SYSTEM

(75) Inventors: Kenneth H. Brockel, Neptune, NJ (US); Harry G. Ivory, Bordentown, NJ (US); Fenton K. Yip, Edison, NJ (US); John P. Finn, West Conshohocken, PA (US); James E. Hagerman, Glen Mills, PA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 346 days.

(21) Appl. No.: 11/318,141

(22) Filed: Dec. 23, 2005

(51) Int. Cl.
- *G08B 1/08* (2006.01)
- *H04Q 7/00* (2006.01)
- *G01C 21/00* (2006.01)
- *G01S 1/00* (2006.01)

(52) U.S. Cl. .............. 340/539.13; 340/539.11; 455/456.1; 455/404.2; 455/90.1; 701/213; 701/214; 342/357.06; 342/357.07

(58) Field of Classification Search .......... 340/539.13; 342/357.06, 357.07; 701/213, 214
See application file for complete search history.

(56) References Cited

U.S. PATENT DOCUMENTS

| | | | | |
|---|---|---|---|---|
| 5,726,663 A | * | 3/1998 | Moyer et al. | 342/419 |
| 5,847,679 A | * | 12/1998 | Yee et al. | 342/357.07 |
| 6,020,845 A | * | 2/2000 | Weinberg et al. | 342/354 |
| 6,552,652 B2 | * | 4/2003 | Beken | 340/407.1 |
| 6,785,553 B2 | * | 8/2004 | Chang et al. | 455/456.5 |
| 7,003,278 B2 | * | 2/2006 | Beni et al. | 455/404.1 |
| 2002/0193108 A1 | * | 12/2002 | Robinett | 455/427 |

* cited by examiner

*Primary Examiner*—Donnie L. Crosland
(74) *Attorney, Agent, or Firm*—Michael Zelenka; George B. Tereschuk

(57) ABSTRACT

A survivor locator system allows for the detection of the location for a person who is lost and requires recovery and extraction from their current environment. By using a phase matched antenna set, a GPS receiver, and a handheld simplified beacon-equipped survival transponder, an estimated distance and bearing data set can be retrieved. If this data set estimation is then fed through an error reduction filter, such as a Kalman filtering algorithm, continually refined location coordinates can be generated, leading the search and rescue crew members to the survivor. The survivor locator system and methods provide a handheld survival radio with reduced complexity.

20 Claims, 5 Drawing Sheets

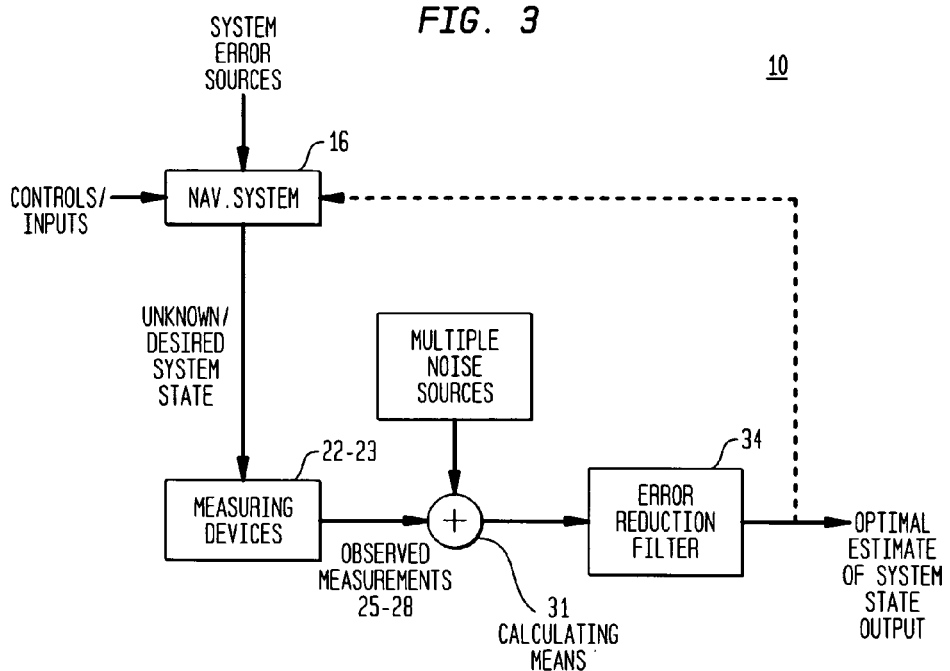
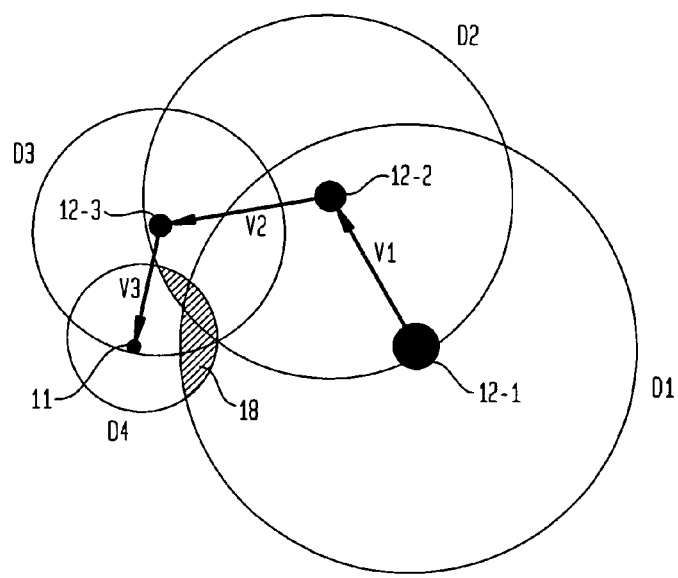

LEGEND

- A    TRANSITION MATRIX
- H    MEASUREMENT MATRIX
- $K_k$    FILTER GAIN
- $P_k$    PROCESS NOISE COVARIANCE
- $P_{KE}$    PROCESS NOISE COVARIANCE
- Q    MEASUREMENT NOISE COVARIANCE
- $V_k$    MEASUREMENT NOISE
- $W_{k-1}$    PROCESS NOISE
- $X_k$    STATE VECTOR AT TIME STEP k
- $Z_k$    MEASUREMENT VECTOR

ULTRA-RELIABLE PERSONNEL POSITION LOCATING SYSTEM

GOVERNMENT INTEREST

The invention described herein may be manufactured, used and licensed by or for the Government of the United States of America without the payment to me of any royalties thereon.

FIELD OF THE INVENTION

The present invention relates generally to airborne survival equipment. In particular, this invention relates to apparatus and methods for obtaining the location of a downed pilot with a fixed handheld wireless unit by using a mobile base station's navigational parameters.

BACKGROUND OF THE INVENTION

Search and rescue for pilots and other airborne personnel are among the military's most important life-saving missions in both peacetime and war, and time is always a critical factor. The extraordinary demands of these critical and dangerous missions have led to the development of several types of airborne survival equipment, including survival radios. Most survival radios use a complicated waveform to allow detection of the survivor or downed pilot. Consequently, they involve the implementation and application of complex communications electronic hardware to secretly recover the downed pilot. In many cases, this is for security and encryption purposes. Other known airborne survivability equipment methods involve using multiple fixed position locator terminals and a mobile survivor handset. One widely used military survival radio is the AN/ARS-6 Radio Set and it is an essential part of a system for military Combat Search and Rescue and it provides the rescue team with the identification, direction and distance to the AN/PRC-112 radio, which is part of the pilot's survival kit. The airborne guidance system locates missing pilots under harsh operating conditions and while concealing their location from hostile enemy forces during dangerous tactical engagements. However, the distance obtained by the present AN/ARS-6 to the survivor can be somewhat inaccurate by about 100 meters, which could be a critical distance when missions are conducted under stormy conditions or hostile fire where time is of the essence.

One potential solution for the lack of pinpoint accuracy that could substantially increase the speed and effectiveness of the rescue effort is to augment the airborne survivability equipment by installing currently available Global Positioning System ("GPS") capabilities on the airborne search platforms. By adding GPS capability to the airborne search platforms and integrating GPS into the search and rescue mission it would be possible to determine a more precise location of the survivor to within about 10-20 meters and save valuable time during which the survivor faces extreme danger. Increasing the current accuracy of about 100 meters to a much smaller location of 10-20 meters would substantially increase the probability of quickly locating the downed pilot and saving the downed pilot minimizing exposure to hazards such as drowning, sharks and hostile enemy forces.

Although augmenting search equipment with GPS capability offers a number of advantages to the airborne search and rescue mission, GPS does suffer from a number of disadvantages, shortcomings and limitations. GPS receivers are susceptible to unintentional disruption from a number of causes including atmospheric effects, multipath errors, signal blockage from foliage and buildings and interference from other communications equipment, as well as deliberate disruption from enemy jamming. Augmenting the search and rescue effort with GPS could introduce errors, in the form of noise, in the calculations for GPS range from the satellite. Using current GPS capability with survival radio transponders like the AN/ARS-6(V) and AN/PRC-112 Radio Sets would, in some cases, add undesirable and dangerous risks of inaccuracy to the already demanding and critical performance parameters of the airborne search and rescue mission.

Thus, there has been a long-felt need for increased accuracy and reliability in airborne survivability equipment that does not suffer from the disadvantages, shortcomings and limitations of GPS disruption and complexity. Prior art survivability equipment typically involves a fixed to semi-mobile ground-based survivor transponder and a mobile search vehicle transponder that is usually deployed in a fixed or rotary wing aircraft. The present invention answers this long-felt need with a survivor locator system that advantageously employs a GPS receiver, a mechanism that enables communication with an encoded transponder/beacon signal and a phase matched antenna set in a mobile base station such as a helicopter to locate the downed pilot's transponder in a fixed position with the mobile base station's navigational parameters to quickly determine estimated distance and bearing data on the pilot's position with a known level of accuracy. The present invention provides airborne survival equipment that adds GPS capability to airborne search and rescue systems suffering from the disadvantages, shortcomings and limitations of inaccuracy, disruption and complex and expensive equipment.

SUMMARY OF THE INVENTION

The general object of the invention is to provide a survivor locator system that incorporates GPS capability into a mobile base station.

Another object of the invention is to provide a survivor locator system that incorporates GPS capability and a beacon into a mobile base station that interrogates communications equipment.

A further object of the invention is to provide a survivor locator system that includes GPS capability, navigational devices and a beacon into a mobile base station that interrogates a survivor radio transponder, without suffering from the disadvantages, shortcomings and limitations of inaccuracy and disruption.

It is still another object of the invention is to provide a survivor locator system that includes the AN/ARS-6 Radio Set, AN/PRC-112 survival radio and the KY-913 Program Loader, GPS capability, navigational devices and a beacon into a mobile base station that interrogates a survivor radio transponder, without suffering from the disadvantages, shortcomings and limitations of inaccuracy and disruption.

Yet another object of the present invention is to provide a method for locating survivors with GPS capability, a beacon and a survivor radio transponder.

The aforementioned objects and advantages can be readily attained with this invention's survivor locator system. The present invention answers this long-felt need with a survivor locator system that advantageously employs a radio transponder to determine distance, a GPS receiver to measure the position of the mobile search platform, integrates downloaded GPS data with a simple distance locator transmission signal, such as a beacon, and quickly determines estimated distance and bearing data on the pilot's position with a high degree of accuracy. The estimated distance and bearing data is then refined through an error reduction filter algorithm and a data processing means, which continually refines location coordinates for the mobile base station crew. Unlike prior art survivability equipment that typically employed fixed or semi-mobile ground-based survivor transponder and an aircraft-based search vehicle transponder, the present invention integrates GPS information and a beacon's distance locator transmission signal to quickly and accurately locate the handheld radio transponder and the survivor's position a more precise measurement of the survivor's position as it relates to the mobile base station. By incorporating relatively simple and inexpensive electronic components, such as the AN/PRC-112 survival radio, the present invention provides a more accurate, less complex and more cost effective survivor location system, without suffering from the disadvantages, shortcomings and limitations of inaccuracy and disruption that plagued prior art systems. The survivor locator system of the present invention was invented for military search and rescue missions, but it can be readily adapted to similar rescue operations in civilian commercial activities such as airliners, shipping, recreational boating and similar endeavors. The present invention also encompasses a method of locating a survivor with a mobile base station having a GPS receiver.

This invention's survivor locator system continually measures the survivor's location and an error reduction filter and computer-generated refined equations permit the system to recursively reduce distance-to-survivor error. Multiple vectors generate a series of reducible concentric circles that graphically depict the error filtered distance estimations and convert GPS-Latitude, GPS-Longitude, and Altitude into x, y, z coordinate system values. The survivor locator system also provides a more secure communications environment because all of the calculations are performed by data processing means on the mobile base station and none of the survivor information is passed in open communication that might be intercepted by hostile forces.

BRIEF DESCRIPTION OF THE DRAWINGS

These and other objects, features, advantages and details of the present invention will become apparent in light of the ensuing detailed disclosure, and particularly in light of the drawings.

FIG. 3 is a block diagram showing the error reduction function of the present invention;

FIG. 4 is a conceptual time-phased diagram of reduced radius overlapping non-concentric circles illustrating the operation of survivor locator system of the present invention;

DETAILED DESCRIPTION OF THE DRAWINGS

Figure 1:
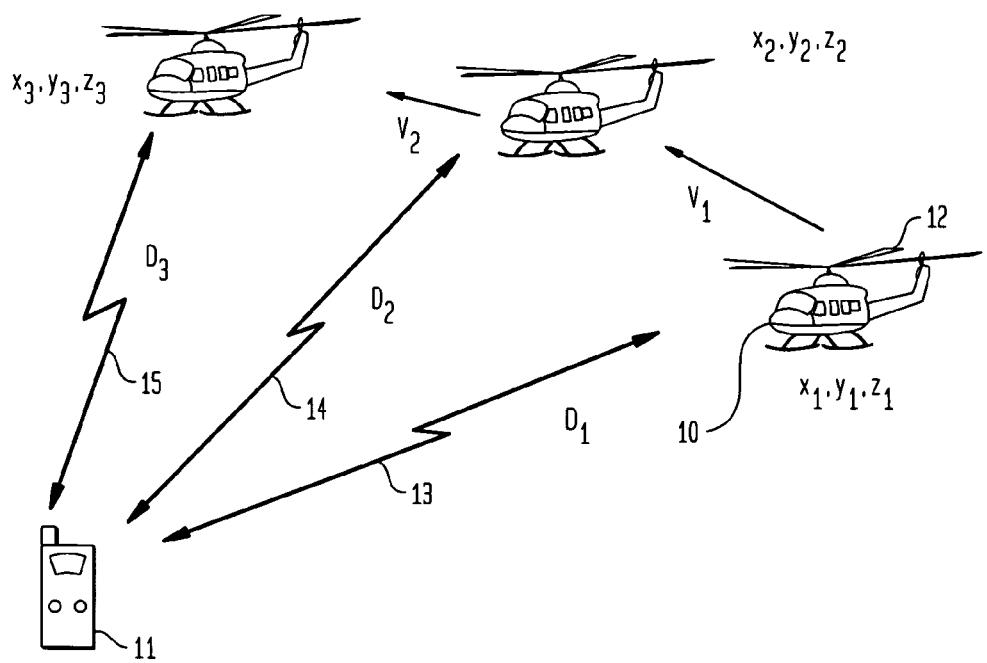
FIG. 1 is a conceptual time-phased drawing of the survivor locator system of the present invention.

Referring now to the drawings, FIG. 1 is a conceptual time-phased drawing of the overall operation of the survivor locator system of the present invention. In anticipation of a search, locate and rescue scenario, the survivor is equipped with a handheld radio transponder 11. FIG. 1 depicts the survivor locator system 10 aboard a mobile search platform 12, such as a rotary wing aircraft, contacting the survivor's handheld transponder 11. In contrast to the transponder 11, the survivor locator system 10 includes a standard GPS receiver, phase matched antenna set, altimeter and other electronic navigational equipment.

In most instances, the survivor remains in a relatively fixed location on the ground and the search crew is airborne. In order to initiate the search process, the survivor locator system 10 interrogates, or "pings," the transponder 11 with a simple pulse on a predetermined continuous wave (CW) radio carrier frequency. Then the survivor locator system 10 receives a response message of multiple RF pulses from the transponder 11 corresponding to each ping in order to acquire the distance of the transponder 11 from the aircraft 12.

In operation, the survivor locator system 10 aboard aircraft 12 initiates searching at location $(x_1, y_1, z_1)$ by pinging transponder 11 with radio pulse 13 to obtain the angular position of transponder 11 relative to the navigational system of aircraft 12. At, or shortly after, each ping the survivor locator system 10 acquires the distance D1 of transponder 11 by calculating the time taken to transmit over each two way path as determined by the speed of wave travel. Through repeated pinging, the location of transponder 11 is calculated using the GPS receiver aboard aircraft 12, as further illustrated in FIG. 2. This bearing information assists the survivor locator system 10 in locating the survivor quickly and accurately, even though the transponder 11 lacks GPS capability. Simultaneously, the survivor locator system 10 obtains the location of aircraft 12 through the GPS receiver. Distance D1 represents the circle of a fixed radius wherein the transponder could be located.

In order to establish a more precise location for transponder 11, multiple pings, usually a minimum of three (3), are needed. As aircraft 12 moves to a new intermediate location $(X_2, y_2, z_2)$ with a velocity $V_1$, it obtains additional ping-derived data points. At the intermediate location $(x_2, y_2, z_2)$, aircraft 12 sends radio pulse 14 to gather additional bearing information. Aircraft 12 continues a flight pattern with velocity $V_2$ with radio pulse 15 to location $(x_3, y_3, z_3)$, and so on. At each location, the survivor locator system 10 obtains constant distance circles of $D_1$, $D_2$, $D_3$ of the transponder 11 relative to the mobile base station 12, and it also downloads the aircraft's GPS parameters. In FIG. 1, radio pulse 15 provides the survivor locator system 10 with the final location of transponder 11. Using the principle of triangulation, the navigational system aboard aircraft 12 obtains the location of transponder 11, with the major task being to hone in on the transponder 11 in a systematic, optimized and quick fashion. Due to variances in the operating environment, such as propagation, equipment and other conditions, an error correction method of some type is needed to determine a position with a +/−10 meters accuracy, which is the error reduction filter described in connection with FIG. 2 below.

Figure 2:
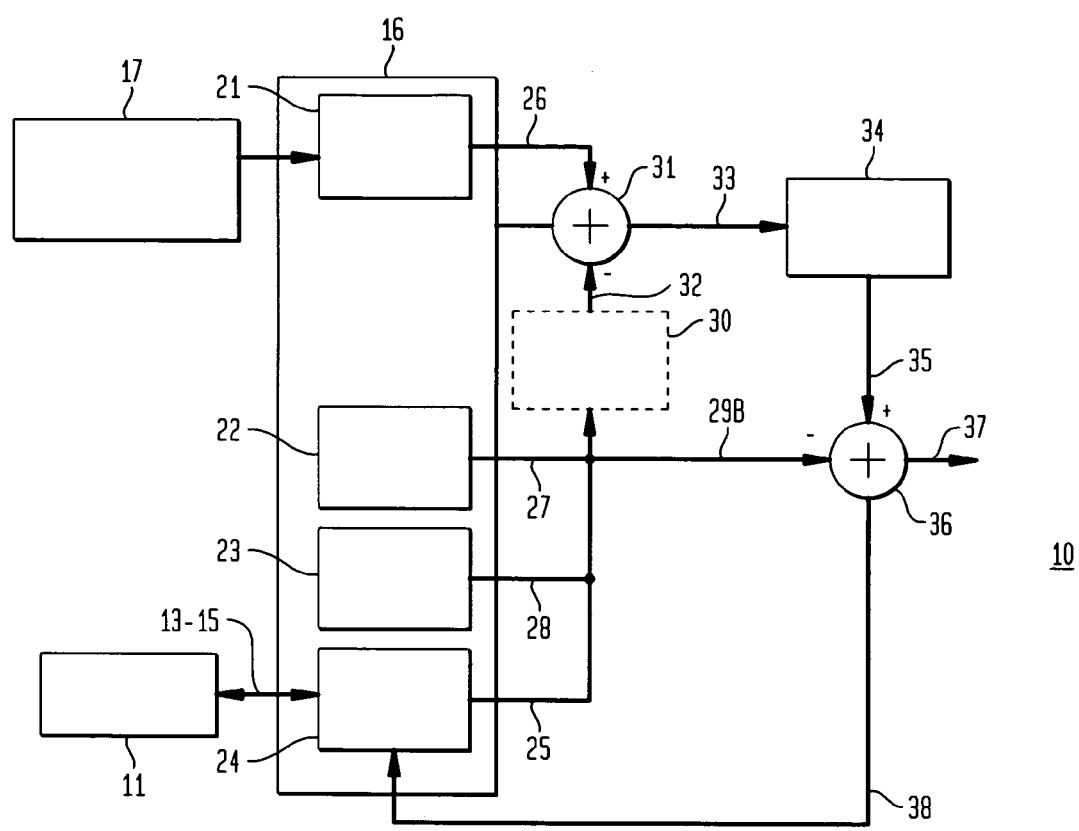
FIG. 2 is a block diagram showing the interaction of the components of the survivor locator system of the present invention.

FIG. 2 is a block diagram showing the components of the survivor locator system 10 of the present invention, using the same numerals for the like structures. The navigational system, represented by box 16, further comprises a GPS receiver 21, an altimeter 22, heading and airspeed indicators 23 and a phase matched antenna set 24. The GPS receiver 21 interacts with a GPS satellite, represented by box 17. A means for data processing resides within the navigational system 16 to control the operation and interaction of the elements of the present invention.

The phase matched antenna set 24 interrogates the transponder 11 with the radio pulses 13-15 depicted in FIG. 1 and provides survivor bearing data, represented by arrow 25, to a means for predicting the next location, represented by box 30, which is a software module. The GPS receiver 21 provides latitude and longitude information, represented by arrow 26, to a means for calculating CIRCLE 31. The altimeter 22 provides an aircraft reference trajectory, represented by arrow 27, to the prediction means 30. The heading and airspeed indicators 23 provide aircraft velocity data, represented by arrow 28, to the prediction means 30. The prediction means 30 receives these data and generates a prediction output, arrow 32, which is provided to the calculating means 31. The calculating means 31 computes a measurement error output, represented by arrow 33, that is sent to an error reduction filter 34. The error reduction filter 34 sends a plurality of survivor coordinate estimates, represented by arrow 35, to a means for calculating corrections, represented by CIRCLE 36. Each of the plurality of survivor coordinate estimates 34 is a point in space described by latitude, longitude and elevation. The correction means 36 provides a plurality of best total survivor location estimate output, arrow 37, and a possible resets input, represented by arrow 38, to the navigational system 16, resulting in a continuous refinement of the transponder 11 bearing information. The best total survivor location estimate output 37 further comprises estimates of errors and noise from the GPS receiver 21, altimeter 22, heading and airspeed indicator 23 and antenna 24.

The underlying theoretical concept for the survivor locating system 10 of the present invention is to achieve a best estimation of location of the transponder 11 and survivor based on the principle of an optimal linear estimator, using the error reduction filter 34. The error reduction filter algorithm from control theory method implements this invention's honing-in process. In operation, the error reduction filter 34 is essentially an optimal recursive data processing algorithm, with the purpose of estimating the state of a system from measurements containing random errors. The error reduction filter 34 minimizes the noise sources that are used in these calculations by reducing the number of errors. Also, using additional GPS readings from GPS satellite 17 for the triangulation process provides an even more efficient and optimized process of rescuing a survivor. The survivor locator system 10 of the present invention advantageously compensates for the inaccuracies and disruptions that create some of the current difficulties associated with GPS. The navigational system 16 aboard aircraft 12 will take waypoint positions at various locations and, through the process of triangulation and using the error reduction filter 34, it provides an increasingly more accurate location of the transponder 11.

FIG. 3 is a block diagram detailing the operation of the error reduction filter 34 of the present invention. The navigational system 16 receives system error source inputs and controls/inputs and provides an unknown/desired system state to the altimeter 22 and heading and airspeed indicator 23 measuring devices. The measuring devices 22-23 provide the observed measurement inputs 25-28 to calculating means CIRCLE 31, which also receives multiple noise sources. The most likely sources of this noise are the UHF transponder signaling process due to the susceptibility of UHF signals to atmospheric and environmental effects, multipath interference, signal blockage from large fixed obstacles and interference from other signal sources, both intentional and unintentional. The error reduction filter 34 minimizes the effects of the multiple noise sources in the calculations by reducing the number of errors. An optimal estimate of system state output is provided as part of the best total estimates output 37 of FIG. 2. The error reduction filter 34 can be a commercially available filter such as the Kalman filter.

The survivor locator system 10 recursively reduces the distance-to-survivor error and the movement of aircraft 12 produces multiple vectors. The multiple vectors generate a series of reducible non-concentric circles based on the error reduction filter 34 providing a series of filtered distance estimations. FIG. 4 is a conceptual time-phased diagram of reduced radius overlapping non-concentric distance circles illustrating the interaction between the error reduction filter 34 and the best total survivor location estimate output 37. Point 12-1 represents the first position of the aircraft from pinging the transponder 11 and D1 is a circle representing the ping result distance from transponder 11 at point 12-1. The aircraft then moves with a velocity $V_1$ to point 12-2. Multiple vectors generate a series of reducible non-concentric circles D2, D3 and D4 that are closer and closer to transponder 11 and depict the error filtered distance estimations and convert GPS-Latitude, GPS-Longitude, and Altitude into x, y, z coordinate system values. The aircraft proceeds from point 12-2 at velocity $V_2$ to reach point 12-3 and then traveling at velocity $V_3$ reaches point 12-4, where transponder 11 and the survivor are located and rescued. The overlapping region 18 is the transponder error map. From these vectors and generating the overlapping non-concentric circles D1-D4, with radii that are effectively and continuously reduced, the principle of error reduction filtered distance estimations can be readily appreciated.

Figure 5:
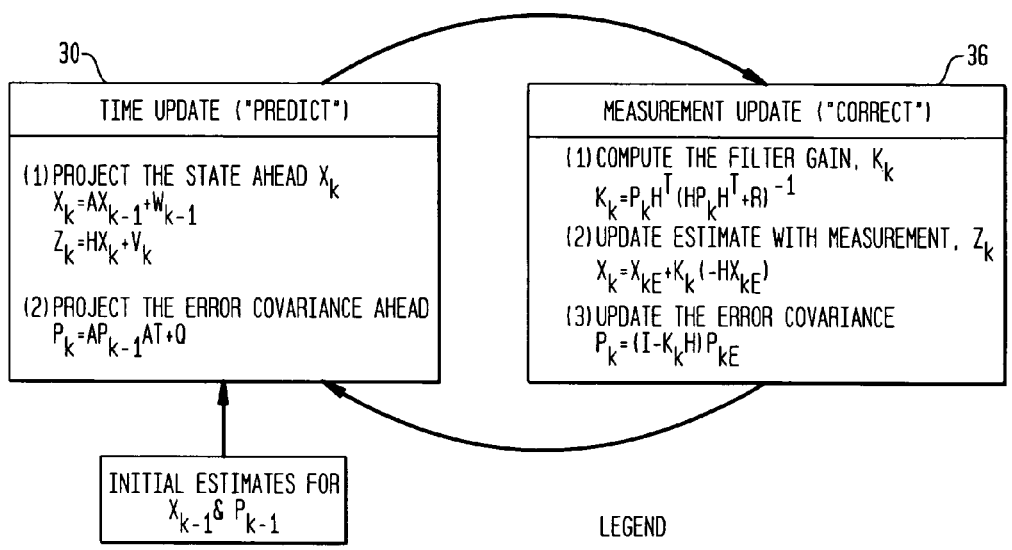
FIG. 5 shows the estimation and measurement functions and associated formulas of the survivor locator system of the present invention.

The mathematical aspect of the error reduction filter 34 is depicted in FIG. 5, and these functions are performed by the prediction means 30 and the correction means 36 software programs included within the data processing means of the navigation system 16. FIG. 5 depicts the initial estimates for state vector $X_{k-1}$ and $P_{k-1}$ at time k and processes noise covariance as inputs to the prediction means 30. The prediction means 30 essentially estimates the location of the survivor and transponder 11 by projecting the state ahead, $X_k$, and the error covariance ahead, $P_k$, with the formulas illustrated in FIG. 5. These inputs are provided to the correction means 36, which calculates filter gain, $K_k$, updated estimate with measurement, $Z_k$, and updated error covariance, $P_k$, with the formulas illustrated in FIG. 5. The outputs from the prediction means 30 and correction means 36 are continually provided from one module to the other as the aircraft 12 approaches the survivor with transponder 11 until the survivor is found.

One embodiment of this invention is the survivor locator system and another embodiment is a survivor locator apparatus that communicates with a survival radio. A number of variations of the survivor locator system are considered within the contemplation of this invention, including the transponder being ruggedized, the prediction means and correction means being software modules and incorporating the AN/PRC-112 survival radio, the AN/ARS-6 Radio Set, KY-913 Program Loader and other military systems such as the Combat Search And Rescue equipment such as the Combat Survivor Evader Locator (CSEL) System. The mobile base station can be a search and rescue helicopter, rotary wing aircraft or any other mobile platform. The survivor locator system of the present invention is also known as the Ultra-Reliable Personnel Position Locating System (URPPLS). Many of these variations also apply to the survivor locator apparatus embodiment.

The survivor locator system and survivor locator apparatus can be used in both military and civilian applications. For military use, this invention provides redundant and more precise capability to locate the position of a downed aviator or other war fighters in need of emergency assistance under very dangerous life-threatening conditions. The survivor locator system can be interoperable with both existing transponders, such as the AN/PRC-112 family of transponders as well as the more modern Combat Survivor Evader Locator (CSEL) System and provides a redundancy or alternate means of location for both systems. This invention's apparatus can also locate the commercial 406 MHZ civilian locator beacons, and with some variance in the waveform can provide a military variant of the civilian 406 MHz capabilities that is not open to the civilian Search And Rescue Satellite Aided Tracking monitors.

Another advantage for military applications is that the ping process also allows the pilot in command of the mobile base station to control the position determination processes and mitigates the need to use sophisticated coding schemes in the transponder waveform to protect sensitive position data from enemy detection. This is because all position calculations are accomplished on the platform computers and all critical command and control data is passed to battlefield command centers through protected data links. This data protection is of critical importance for military applications. Another benefit to both the commercial and military users is the simplicity in the transponder design that can result in lower energy use that adds valuable mission time to the transponder capability.

Figure 6:
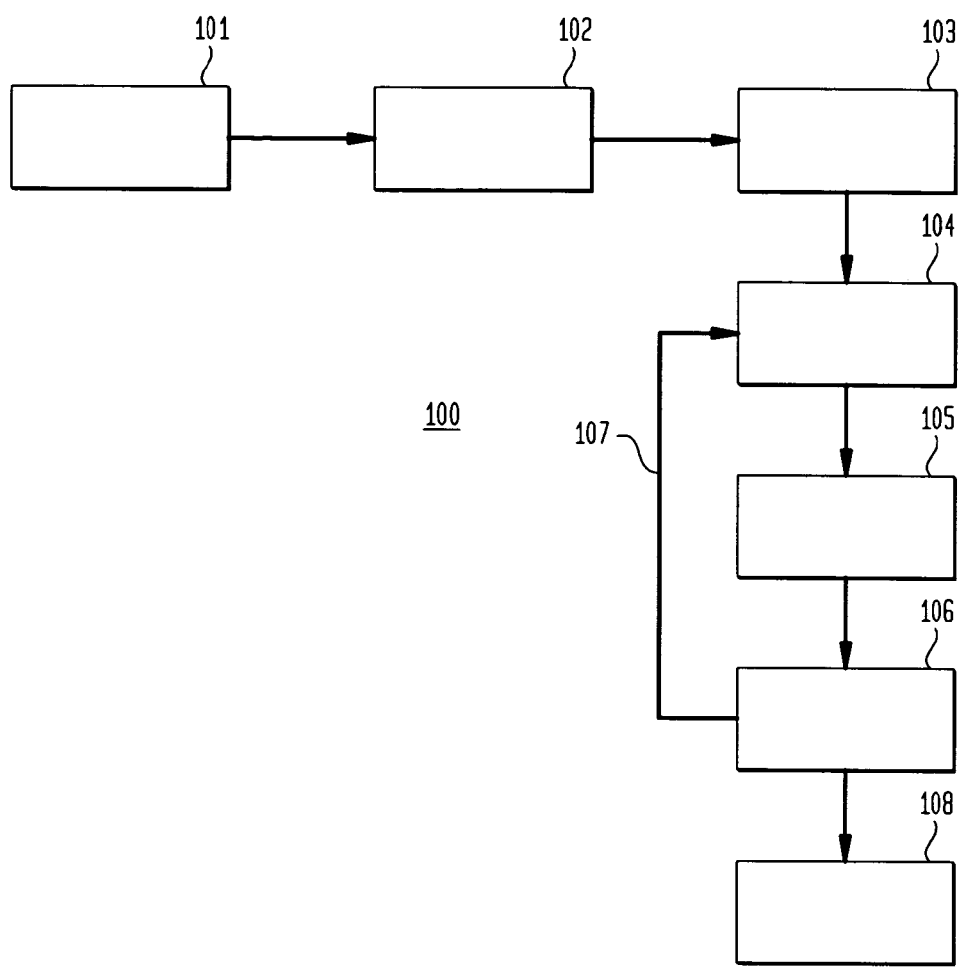
FIG. 6 is a flow diagram showing the major steps of the method of the present invention.

FIG. 6 is a flow diagram showing the major steps of a method of locating a survivor with a mobile base station having a GPS receiver 100, comprising the steps of placing the GPS receiver, an altimeter, a heading and airspeed indicator and a phase matched antenna set on a mobile base station; providing the mobile base station with a navigational system; the survivor activating a transponder in an emergency 101; interrogating the transponder with the phase matched antenna set and establishing the GPS and navigation system positions 102. The establishing the GPS and navigation system positions step 102 further comprises the steps of receiving survivor bearing data from the transponder; receiving mobile base station location inputs from the GPS receiver, which is communicating with a GPS satellite; providing the survivor bearing data and the location inputs to a means for data processing having a means for prediction and a means for correction. During a computing step 103 the prediction means provides a prediction output to the correction means and the prediction means receives a corrected output from the correction means for further updating. The method continues with steps for approaching the survivor; sending a measurement error input from an error reduction filter having a recursive data processing algorithm to the prediction means 104 and generating a course to the transponder 105; estimating a state of system from a plurality of measurements containing a plurality of random errors from the error reduction filter; sending a plurality of survivor coordinate estimates and a plurality of filtered distance estimations from the error reduction filter to the correction means; computing the next pinging location 106; sending a plurality of additional measurement error inputs to the error reduction filter, represented by arrow 107 and recursively reducing a distance-to-survivor error factor; continually updating the plurality of best total survivor location estimates. In a vector producing step, a group of vectors generate a reducible concentric circles from the correction means, the prediction means and the error reduction filter. During a locating the transponder step 108 the mobile base station rescues the survivor. Many of the variations to the survivor locator system and the survivor locator apparatus may also apply to the method of the present invention.

It is to be further understood that other features and modifications to the foregoing detailed description are within the contemplation of the present invention, which is not limited by this detailed description. Those skilled in the art will readily appreciate that any number of configurations of the present invention and numerous modifications and combinations of materials, components, arrangements and dimensions can achieve the results described herein, without departing from the spirit and scope of this invention.

Accordingly, the present invention should not be limited by the foregoing description, but only by the appended claims.

What we claim is:

1. A survivor locator system, comprising:
    a radio transponder is activated by a survivor;
    a Global Positioning System (GPS) receiver, an altimeter, a heading and airspeed indicator and a phased matched antenna set are deployed in a mobile search platform with a navigational system;
    said phased matched antenna set interrogates said transponder and receives a plurality of survivor bearing data from said transponder;
    said GPS receiver receives a plurality of mobile base station location inputs from a GPS satellite;
    said plurality of survivor bearing data and said plurality of location inputs are provided to a means for data processing, said data processing means having a means for prediction and a means for correction;
    said prediction means provides a prediction output to said correction means, said correction means provides a corrected output to said prediction means for further updating as said mobile base station moves toward said survivor;
    said prediction means sends a measurement error input to an error reduction filter having a recursive data processing algorithm;
    said error reduction filter estimates a state of system from a plurality of measurements containing a plurality of random errors and sends a plurality of survivor coordinate estimates and a plurality of filtered distance estimations to said correction means; and
    said correction means provides a plurality of best total survivor location estimates to recursively reduce a distance-to-survivor error factor, said plurality of best total survivor location estimates being continually updated, said correction means, said prediction means and said error reduction filter cooperating to produce a plurality of vectors to generate a plurality of reducible concentric circles locating said transponder to permit rescue of said survivor.

2. The survivor locator system, as recited in claim 1, further comprising said correction means and said prediction means continually updating one another.

3. The survivor locator system, as recited in claim 2, further comprising said error reduction filter minimizing a plurality of noise sources in a series of calculations by reducing a plurality of errors.

4. The survivor locator system, as recited in claim 3, further comprising said transponder being a survival radio.

5. The survivor locator system, as recited in claim 4, further comprising said mobile base station being a rotary wing aircraft.

6. The survivor locator system, as recited in claim 5, further comprising said error reduction filter being a Kalman filter.

7. The survivor locator system, as recited in claim 6, further comprising said system being called the Ultra-Reliable Personnel Position Locating System.

8. A survivor locator apparatus, comprising:
a Global Positioning System (GPS) receiver, an altimeter, a heading and airspeed indicator and a phased matched antenna set are deployed in a mobile base station;
said mobile base station having a navigational system;
said phased matched antenna set interrogates a radio transponder and receives a plurality of survivor bearing data from said transponder;
said GPS receiver receives a plurality of mobile base station location inputs from a GPS satellite;
said plurality of survivor bearing data and said plurality of location inputs are provided to a means for data processing, said data processing means having a means for prediction and a means for correction;
said prediction means provides a prediction output to said correction means, said correction means provides a corrected output to said prediction means for further updating as said mobile base station moves toward said survivor;
said prediction means sends a measurement error input to an error reduction filter having a recursive data processing algorithm;
said error reduction filter estimates a state of system from a plurality of measurements containing a plurality of random errors and sends a plurality of survivor coordinate estimates and a plurality of filtered distance estimations to said correction means; and
said correction means provides a plurality of best total survivor location estimates to recursively reduce a distance-to-survivor error factor, said plurality of best total survivor location estimates being continually updated, said correction means, said prediction means and said error reduction filter cooperating to produce a plurality of vectors to generate a plurality of reducible concentric circles locating said transponder to permit rescue of a survivor.

9. The survivor locator apparatus, as recited in claim 8, further comprising said correction means and said prediction means continually updating one another.

10. The survivor locator apparatus, as recited in claim 9, further comprising said transponder being sufficiently rugged to survive an aircraft crash landing and be operable.

11. The survivor locator apparatus, as recited in claim 10, further comprising said error reduction filter minimizing a plurality of noise sources in a series of calculations by reducing a plurality of errors.

12. The survivor locator apparatus, as recited in claim 11, further comprising including an AR/ARS-6 Radio Set, an AN/PRC-112 survival radio and a KY-913 Program Loader.

13. The survivor locator apparatus, as recited in claim 12, further comprising said mobile base station being a rotary wing aircraft.

14. The survivor locator apparatus, as recited in claim 13, further comprising said error reduction filter being a Kalman filter.

15. A method of locating a survivor with a mobile base station having a Global Positioning System (GPS) receiver, comprising the steps of:
placing said GPS receiver, an altimeter, a heading and airspeed indicator and a phased matched antenna set on said mobile base station;
providing said mobile base station with a navigational system;
activating a radio transponder in an emergency;
interrogating said transponder with said phased matched antenna set;
establishing a GPS and navigation system position and cooperating with a means for data processing, said data processing means having a means for prediction and a means for correction;
providing a prediction output from said prediction means to said correction means;
providing a corrected output from said correction means to said prediction means for further updating;
approaching said transponder;
sending a measurement error input from an error reduction filter having a recursive data processing algorithm to said prediction means;
generating a course to said transponder;
estimating a state of system from a plurality of measurements containing a plurality of random errors from said error reduction filter;
sending a plurality of survivor coordinate estimates and a plurality of filtered distance estimations from said error reduction filter to said correction means;
computing a next pinging location;
providing a plurality of additional measurement error inputs to said error reduction filter and recursively reducing a distance-to-survivor error factor from said correction means;
continually updating a plurality of best total survivor location estimates;
producing a plurality of vectors with said error reduction filter that generate a plurality of reducible concentric circles reducing the field of search to better locate said transponder;
locating said transponder; and
rescuing said survivor.

16. The method of locating survivors with the mobile base station having a GPS receiver, as recited in claim 15, further comprising the step of continually updating said correction means and said prediction means.

17. The method of locating survivors with the mobile base station having a GPS receiver, as recited in claim 16, said establishing step further comprising the steps of:
receiving a plurality of survivor bearing data from said transponder;
receiving a plurality of mobile base station location inputs from said GPS receiver, said GPS receiver communicating with a GPS satellite; and
providing said plurality of survivor bearing data and said plurality of location inputs to said data processing means.

18. The method of locating survivors with the mobile base station having a GPS receiver, as recited in claim 17, further comprising the step of minimizing a plurality of noise sources in a series of calculations by said error reduction filter to reduce a plurality of errors.

19. The method of locating survivors with the mobile base station having a GPS receiver, as recited in claim 18, further comprising the step of including an AR/ARS-6 Radio Set, an AN/PRC-112 survival radio and a KY-913 Program Loader.

20. The method of locating survivors with the mobile base station having a GPS receiver, as recited in claim 19, further comprising the step of providing a rotary wing aircraft for said mobile base station.

* * * * *